Aug. 5, 1924.                                                            1,503,498
                        J. B. HADAWAY
                     LAST MEASURING MACHINE
                      Filed Sept. 17, 1918
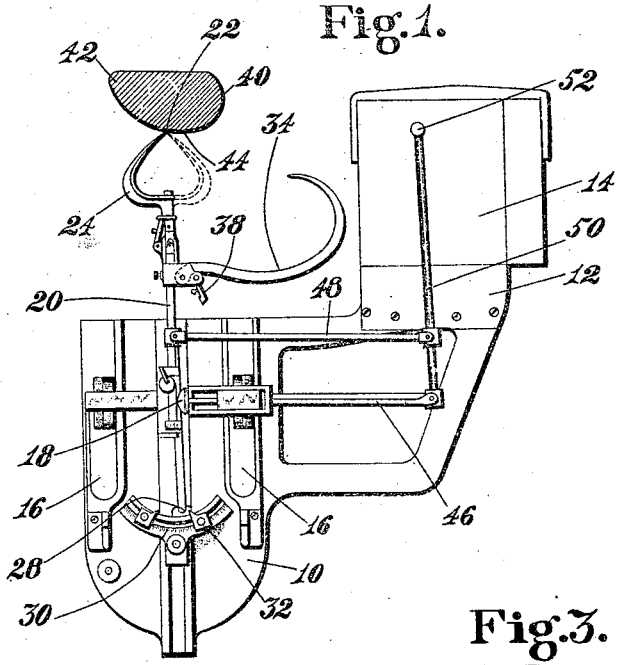
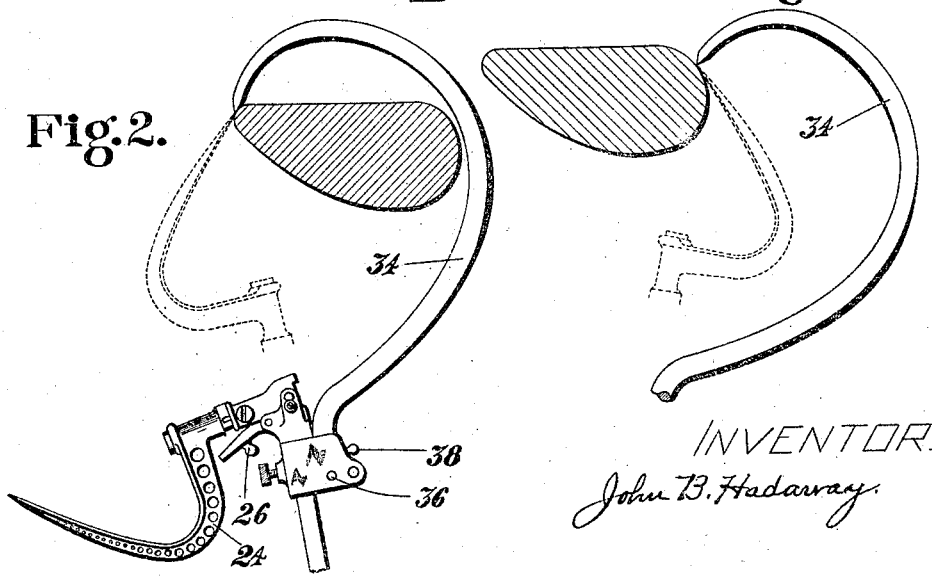
INVENTOR
John B. Hadaway.

Patented Aug. 5, 1924.

1,503,498

UNITED STATES PATENT OFFICE.

JOHN B. HADAWAY, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY.

LAST-MEASURING MACHINE.

Application filed September 17, 1918. Serial No. 254,413.

*To all whom it may concern:*

Be it known that I, JOHN B. HADAWAY, a citizen of the United States, residing at Swampscott, in the county of Essex and State of Massachusetts, have invented certain Improvements in Last-Measuring Machines, of which the following description, in connection with the accompanying drawings, is a specification, like reference characters on the drawings indicating like parts in the several figures.

This invention relates to the measurement of solid bodies and is disclosed by way of illustration as embodied in a machine especially designed for measuring the cross-sections of boot or shoe lasts.

It has been the practice heretofore to design shoe lasts without proper consideration of their solid shape. All measurements taken on lasts under the procedure heretofore obtaining have been linear ones, comprising lengths and perimeters. The perimeter of a last obviously tells nothing about the shape or area at the measured section or any part of it so that little about the "foot room" in lasts can be determined by such measurements. It would be of very great practical importance, therefore, to be able to determine practicably and conveniently the actual shape and cross-sectional area of lasts at the measured points.

Planimetrical measurements have been difficult because of the solid form of a last and the undesirability of cutting it in two on the section to be measured. The invention of John J. Heys for which patent was applied for Aug. 31, 1916 by application Ser. No. 117,910, provides for the first time a machine and process for making such planimetrical measurements without destroying the last. Its use is subject, however, to the disadvantage that the measured area is divided into parts which are separately measured, the last being turned after each partial measurement in order to present the next portion of the section to the planimeter.

It is a principal object of my invention to obviate this and other difficulties and to provide a machine by means of which inaccessible cross-sections of lasts and other solid bodies may be measured and plotted, with convenience and speed.

An important feature of the invention consists in a mechanical integrator having a tracing mechanism constructed and arranged to traverse continuously the periphery of a section of a solid object. An irregular body such as a last may thus be measured conveniently and accurately. In the illustrated embodiment of the invention I have provided a plurality of tracing points or tracers, arranged to traverse the periphery of the section in segments one after the other, each point being arranged to co-operate effectively with the segment which it is intended to traverse. Such tracing points preferably have the same operative position, and each is arranged to be movable into and out of said position in order to permit the unimpeded use of another.

In another aspect the invention provides a tracer carrying mechanism arranged to extend around a solid object on opposite sides, so that a continuous traverse of the periphery of a section is provided for. In this aspect of the invention, an important feature consists in a plurality of tracer arms extending in different directions to the effective positions of the tracers carried by them.

A further feature of the invention consists in the combination of tracing mechanism arranged to traverse continuously the periphery of a section of a solid body and scribing mechanism arranged to trace simultaneously an outline forming a preferably full-sized reproduction of the periphery of the section. This feature provides for obtaining simultaneously the area and form of the cross-section in one operation.

These and other features of the invention including certain details of construction and combinations of parts will now be described in connection with the following description of a preferred embodiment of the invention, selected for purposes of illustration and shown in the drawings in which,—

Fig. 1 is a plan view of a machine embodying the invention, and

Figs. 2 and 3 are enlarged details of the tracer mechanism.

A table 10 having an offset arm 12 carrying a flat surface for the reception of a piece of paper or the like 14 is provided with suitable tracks 16 adapted to support a planimeter 18. An ordinary commercially obtainable rolling planimeter is shown, but any desired mechanical integrator may be used. The registration mechanism of the planimeter shown is caused to operate by carrying the end of its tracer arm 20 around the area which it is desired to measure, in this instance the cross section of the last. The tracer point in planimeters of the type shown is located at 22 and is ordinarily found at the end of the arm 20. The arm 20, however, would interfere with the surface of a solid body such as a last, if measurement thereof were attempted, and according to the present invention, this arm has been modified in order to permit the convenient measurement of a solid body such as a last. The arm 20 is shortened and upon its end is mounted an offset tracer carrying member 24 terminating at the tracing point 22. This arm is arranged to pivot 180° around the axis of the arm 20 so that it can assume two operative positions, as shown in full and dotted lines in Fig. 1. It is also arranged to pivot about a vertical axis as shown in Fig. 2 so that it can be removed entirely from operative position. A latch 26 secures it in operative position and can be disengaged in order to release it from operative position without disturbing any of the other mechanisms. The arm 24 is thus adapted to trace that portion of the periphery of a solid object which lies toward the planimeter, being rotatable into one or the other of the two positions shown in Fig. 1, whichever is best adapted for contact with that part of the periphery being traced, without any disturbance of the registering mechanism so that a continuous record can be obtained.

The arm 20 is shown as prolonged to the rear at 28 and a cam guide 30 is shown shaped in such manner that the movement of the end 28 in contact with it corresponds to a straight line movement of the tracer at 22. Adjustable stops 32 limit the movement of the rear end of the arm 28. All of the above described mechanism is shown substantially in accordance with the machine built by John J. Heys and embodying inventions of the said Heys which are covered by the application referred to. The procedure contemplated in the use of the Heys machine is as follows:—

By means of a suitable scribing apparatus, two points exactly opposite each other transversely to the normal position of the arm 20 are marked upon the sides of the last to be measured. The arm 24 with the tracer at 22 is run over the inner side of the last from one point to the other. The arm 24 is then swung into inoperative position, the last is turned 180° upon its support in order to present the other side thereof to the machine; the planimeter is caused to record the result of a movement of the tracer located at 22 from one of the marked points to the other in a straight line, thereby causing the registering mechanism to register the area of that part of the cross-section bounded by the traversed portion of the periphery and the straight line joining the two marked points by means of a traverse of the point 28 over the cam 30, and then the operation is repeated. This procedure ascertains the area of the last section in two parts which are then combined to give the result desired.

My invention, on the other hand, provides for the measurement of the entire section of the last in question without the necessity of shifting the last or of combining the results of several operations, the whole operation being accomplished by me in a continuous manner. Accordingly, I provide a tracer carrying arm 34 pivoted to the arm 20 at 36 and held in operative position by a latch 38 which can be thrown back in order to allow the arm 34 to be moved into inoperative position. Fig. 1 shows the inoperative position and Fig. 2 shows the operative position of the arm 34. The arm 34 as shown is shaped like an interrogation point. It is made upon a wide curve so that it may surround the object to be measured and is arranged to hold its tracing point at the point 22, already discussed, in the axis of the arm 20. It is curved in such a wide sweep that it extends its tracing point toward the planimeter instead of away from it as does the arm 24.

It is therefore possible for the arm 34 to start with its tracing point at a point of the periphery of the object located to one side thereof as seen from the planimeter and to trace the periphery around the back of the object as seen from the planimeter to a point on the other side, so that the arm 34 substantially embraces the object as shown in Fig. 2. The arm 24 may then be swung into operative position as shown in dotted lines in Fig. 2, and the arm 34 may be released by loosening the latch 38 so that it will swing into the position shown in Fig. 1 and the tracing may be continued by means of the point on the end of the arm 24 until the approximate front center of the object has been reached, when the arm 24 will be reversed to the dotted position shown in Fig. 1 and the tracing continued to the initial point. The tracing operation will have been performed continuously beginning at a point 40 and passing to a point 42 by means of the arm 34, then from 42 to 44 and back to 40 by means of the arm 24, the registering mechanism of the planimeter having registered continuously during the operation. The area will therefore be determined in one operation without the necessity of the operator giving his attention to widely separated parts of the mechanism, or of disturbing one carefully adjusted part while moving another.

In order to obtain a graphic representation of the section made, I have provided a pantagraphic scribing mechanism arranged to draw a representation of the measured section upon the paper supported upon the table 14. This mechanism comprises an arm 46 rigidly mounted on the rolling frame of the planimeter. This arm will therefore always remain parallel to itself as the planimeter rolls back and forth. An arm 48 is pivoted to the arm 20 and to an arm 50, the rear end of which is pivoted to the arm 46. The arms 50 and 46, 20 and 48 form a parallelogram so that the movement of a scriber 52 placed at the end of the arm 50 will correspond exactly to the movement of the tracing point at 22, the arm 50 being of the same length as the distance from the point 22 to the pivot of the arm 20 upon the planimeter.

I have thus provided a means for continuously integrating around the periphery of a solid object and simultaneously scribing accurately the outline around which the integration is performed. It will be noticed that the two tracer carrying arms 24 and 34 are so relatively shaped that when the arm 24 is turned into the dotted line position shown in Fig. 1 it will be embraced by the arm 34 in operative position. It is therefore possible to move one of these arms into operative position while the other is holding its tracing point in contact with a point on the periphery where the stop has been made to interchange arms. Thus the arms can be interchanged at the sides of the object without any danger of disturbing the registering mechanism of the planimeter.

The usefulness of my invention will be apparent without further discussion. A last may be supported in any desired way with any desired section in the plane of operation of the planimeter and the area and shape of the section determined continuously in one operation. The entire last may be investigated in this way through different parallel or nonparallel sections. A human foot may be supported in position to be traced by the tracer point at 22 and measured and plotted, and a last may be designed in accordance with the shape and size of the foot which will fit the foot more accurately than a last made according to any existing system of measurement, such systems relying wholly upon linear measurements of various kinds.

Having thus described my invention, what I claim as new and desire to secure by Letters Patent of the United States is:—

1. A mechanical integrator having a plurality of relatively movable tracer arms, each carrying a tracing point, means for mounting the arms so that they are arranged to have their tracing points simultaneously at the same operative position when desired, to facilitate the interchange of tracing arms during an operation.

2. A mechanical integrator having a plurality of independently mounted tracer arms, each carrying a tracing point, the mounting of each arm comprising means for placing its tracing point in or out of operative position when another tracing point is in operative position to facilitate the interchange of tracing arms during an operation.

3. A mechanical integrator having a plurality of tracer arms, each carrying a tracing point, the operative positions of the tracing points being substantially identical, and each of the arms being independently movable to displace its tracing point to an inoperative position.

4. A mechanical integrator having a plurality of tracer arms, each carrying a tracing point, and means for mounting the arms so that they may be arranged to bring their tracing points simultaneously into the same operative position, one of the arms being independently operable to move its tracing point to an inoperative position.

5. A mechanical integrator having a plurality of independently movable tracer arms, each carrying a tracing point, and means for mounting the arms so that they may bring their tracing points simultaneously into the same operative position, the arms being independently operable to bring their tracing points to inoperative positions in order to permit the unobstructed use of either tracing point at will.

6. A mechanical integrator having tracer carrying mechanism with opposed portions arranged to operate upon opposite sides of a solid object, and means for independently and relatively moving the opposed portions to the same operative position without interference from one another to provide for continuous traverse of the periphery of a cross-section of the object by tracing mechanism carried on the carrying mechanism.

7. A mechanical integrator having a plurality of tracer carrying arms, and means for mounting the arms so that they may be used interchangeably or may be adjusted to surround temporarily a solid object with their points in registration.

8. A mechanical integrator having means for mounting a plurality of tracer carrying arms so that they may surround a solid object, said arms carrying tracing points having substantially identical operative positions.

9. A mechanical integrator having a plurality of tracer carrying arms constructed and arranged to surround a solid object, said arms carrying tracing points in substantially identical operative positions and each point being movable from operative position to permit the substitution of the other during the continuous traverse of the object.

10. A mechanical integrator having a tracer carrying arm constructed and arranged to extend around a solid object and contact with it over that part of the periphery of a section lying away from the integrator and having a second tracer carrying arm constructed and arranged to present a tracer to that part of the said periphery which lies toward the integrator, said arms being arranged to extend toward each other to bring their tracers into contact.

11. A mechanical integrator having a tracer carrying arm constructed and arranged to extend around a solid object from one side to the other of that face of the object lying away from the integrator, and a second tracer carrying arm arranged to extend around the object from one side to the other, of a face extending from the first-mentioned face toward the integrator, said arms being arranged for simultaneous contact with the same point of the object to permit interchange of one for the other without interruption of the measuring operation.

12. A mechanical integrator having a tracer carrying arm constructed and arranged to extend around a solid object from one side to the other of that face of the object lying away from the integrator, and a second tracer carrying arm arranged to extend around the object from one side to the other, of a face extending from the first-mentioned face toward the integrator, said arm being constructed and arranged to follow with a tracer the contour of either side of the object.

13. A mechanical integrator having a tracer carrying arm constructed and arranged to extend around a solid object from one side to the other of that face of the object lying away from the integrator, and a second tracer carrying arm arranged to extend around the object from one side to the other of a face extending from the first-mentioned face toward the integrator, said arm being reversible to extend around either side of the object.

14. A mechanical integrator having integrating mechanism, a plurality of tracer carrying arms, and means for mounting them so that they can extend simultaneously in substantially different directions to the effective positions of tracing points carried by them, respectively, whereby the area traced by the points may be integrated.

15. A mechanical integrator having means for supporting a plurality of tracer carrying arms so that they can extend simultaneously in substantially opposite directions to the effective positions of tracing points carried by them, respectively.

16. A mechanical integrator having two tracer carrying arms arranged to present their tracing elements at substantially the same operative position, both of said arms being curved, one more deeply than the other in such manner that the one may envelop the other, and the other arm being reversible to a position opposed to that of the one in such manner that the two arms may embrace the object to be measured.

17. A mechanical integrator having a plurality of tracer carrying arms and means for supporting them so that they may encircle completely the object to be measured.

18. A mechanical integrator having a plurality of tracer carrying arms and means enabling the said arms in combination to encircle completely the object to be measured, and to present their respective tracing instrumentalities in substantially identical operative positions, and to be movable away from the operative position.

19. A mechanical integrator having a tracing point carrier constructed and arranged to carry a tracing point over a segment of the periphery of a solid object, and a second tracing point carrier constructed and arranged to carry its tracing point from the end of the path traced by the first over an adjoining segment of the said periphery, incidental to a continuous measuring operation.

20. A mechanical integrator having two tracer carrying arms one of which is constructed and arranged to move its tracer point from a point in the periphery of an object around the periphery to a point on the other side of the object, and the other of which is constructed and arranged to thereupon position its tracer point in contact with the first-named tracer point and the object at this point and to carry it around the remainder of the periphery to the first-mentioned point.

21. A mechanical integrator having a tracer arm extending from the main body of the integrator toward the operative position of the tracing point, but of insufficient length to reach said position, said arm carrying offset tracer carrying members and means enabling the said members to carry their tracers in said operative position and to surround the object to be measured so that the tracers may in succession in operative position traverse continuously the entire periphery of the object.

22. A mechanical integrator having tracing mechanism constructed and arranged to traverse continuously the periphery of a solid body while continuously maintaining operative connection therewith and scribing mechanism connected therewith constructed and arranged to scribe simultaneously an outline corresponding to the said periphery.

23. A mechanical integrator having tracing mechanism constructed and arranged to traverse continuously the periphery of a solid body while continuously maintaining operative connection therewith and scribing mechanism pantagraphically connected therewith constructed and arranged to scribe simultaneously an outline corresponding to the said periphery.

24. A mechanical integrator comprising registering mechanism, tracer carrying mechanism constructed and arranged to operate the registering mechanism by movement corresponding to the movement of a tracer point around the object to be measured, and comprising means for continuously tracing the periphery of a solid body while continuously maintaining operative contact therewith, whereby the registering mechanism may continuously integrate around the said periphery.

25. A mechanical integrator comprising registering mechanism and tracing mechanism operating the registering mechanism and constructed and arranged to continuously contact with and traverse the periphery of an intermediate section of a solid object.

26. A mechanical integrator constructed and arranged to integrate a section of a solid body by movements in the plane of the section, having a tracing means arranged continuously to contact with and traverse the periphery of the section.

27. A mechanical integrator arranged to move in a plane and to measure a characteristic of an area lying in the plane, comprising a tracing mechanism constructed and arranged continuously to contact with and traverse the periphery of a solid object to which the area is appurtenant.

In testimony whereof I have signed my name to this specification.

JOHN B. HADAWAY.